June 12, 1928.

A. DOW 1,673,279

VARIABLE SPEED POWER TRANSMISSION

Filed June 25, 1925    9 Sheets-Sheet 7

INVENTOR
ALEXANDER DOW
BY F. H. Gibbs
ATTORNEY

June 12, 1928.

A. DOW 1,673,279

VARIABLE SPEED POWER TRANSMISSION

Filed June 25, 1925   9 Sheets-Sheet 8

INVENTOR
*Alexander Dow*
BY *F. H. Gibbs*
ATTORNEY

June 12, 1928.

A. DOW 1,673,279

VARIABLE SPEED POWER TRANSMISSION

Filed June 25, 1925   9 Sheets-Sheet 9

INVENTOR
ALEXANDER DOW.
BY *F. H. Gibbs*
ATTORNEY

Patented June 12, 1928.

1,673,279

UNITED STATES PATENT OFFICE.

ALEXANDER DOW, OF NEW YORK, N. Y., ASSIGNOR TO DOW TRANSMISSION CORPORATION, OF NEW YORK, N. Y., A CORPORATION OF NEW YORK.

VARIABLE-SPEED POWER TRANSMISSION.

Application filed June 25, 1925. Serial No. 39,525.

The accompanying drawings illustrate an embodiment of one application of my invention. However, it is to be understood that the invention is not limited to the exact details of construction shown and described, as modifications thereof will occur to persons skilled in the art.

My invention relates to geared power transmission mechanism whereby the relative speeds of a prime mover and driven shaft may be altered in any manner to afford such changes in their relative torques as conditions may demand, and is a continuation in part of my application for Letters Patent, Ser. No. 725,402, filed July 11, 1924, for improvement in variable speed power transmission.

One object of my present invention when applied to motor car construction is to afford a means whereby the changes of gear ratios are effected by the combined use of the throttle, or foot accelerator, and the conventional engine clutch pedal, without, however, disengaging the clutch between the engine and the transmission.

A further object of my invention is to provide means whereby all gear changes will be made with the utmost ease by the driver and with great quickness, at the same time eliminating shock and jar and contributing smoothness to the operation of the vehicle by taking advantage of the synchronizing of the various parts of the mechanism resulting from the reversal of torque produced by the momentum of the car when the engine is slowed down and its consequent effect upon the epicyclic train as will be further explained; to cause the gear to automatically start in low when the car has been brought to a full stop; to afford the quickest possible getaway when starting; to supply means whereby the gear can be changed from high to second at any speed of the engine without shock or jar, whether ascending or descending hills, thus contributing to the comfort and safety of the driver and passengers; to hold the gear locked in second if desired; by superior braking mechanism to prevent side slip; to remove the necessity of constantly clutching and declutching the engine; to decrease the possibility of stalling the engine upon hills and otherwise to improve the general characteristics of automobile operation.

It consist of an improved construction whereby the members of the epicyclic train which must be held to produce different gear ratios are brought to rest by automatic mechanism without shock so that the gear ratios flow from one into another with imperceptible gradation.

While my invention can be used for many purposes in the arts, it is particularly desirable and effective where frequent changes of gear ratio are required as in the driving of a motor car.

In the following specification and accompanying drawings I have disclosed in what manner my invention is applied to control the gearing necessary in an automobile, but I do not limit myself to this particular use, or to any prime mover or source of power to which the mechanism may be adaptable.

As embodied in a motor car, my transmission is furnished with a hand shifting lever by which changes of direction of the movement of the car from forward to reverse, and to a neutral position of the gearing which permits the engine to idle, are determined. But all other changes of gear are brought about by altering the position of the clutch pedal and reversing the torque in the transmission by manipulating the foot accelerator and causing the engine to assume a less speed than that called for by the speed of the vehicle, the momentum of the car thus being taken advantage of to spin the central members of the epicyclic train and produce the synchronization desired.

In said drawings.

Figure 3:
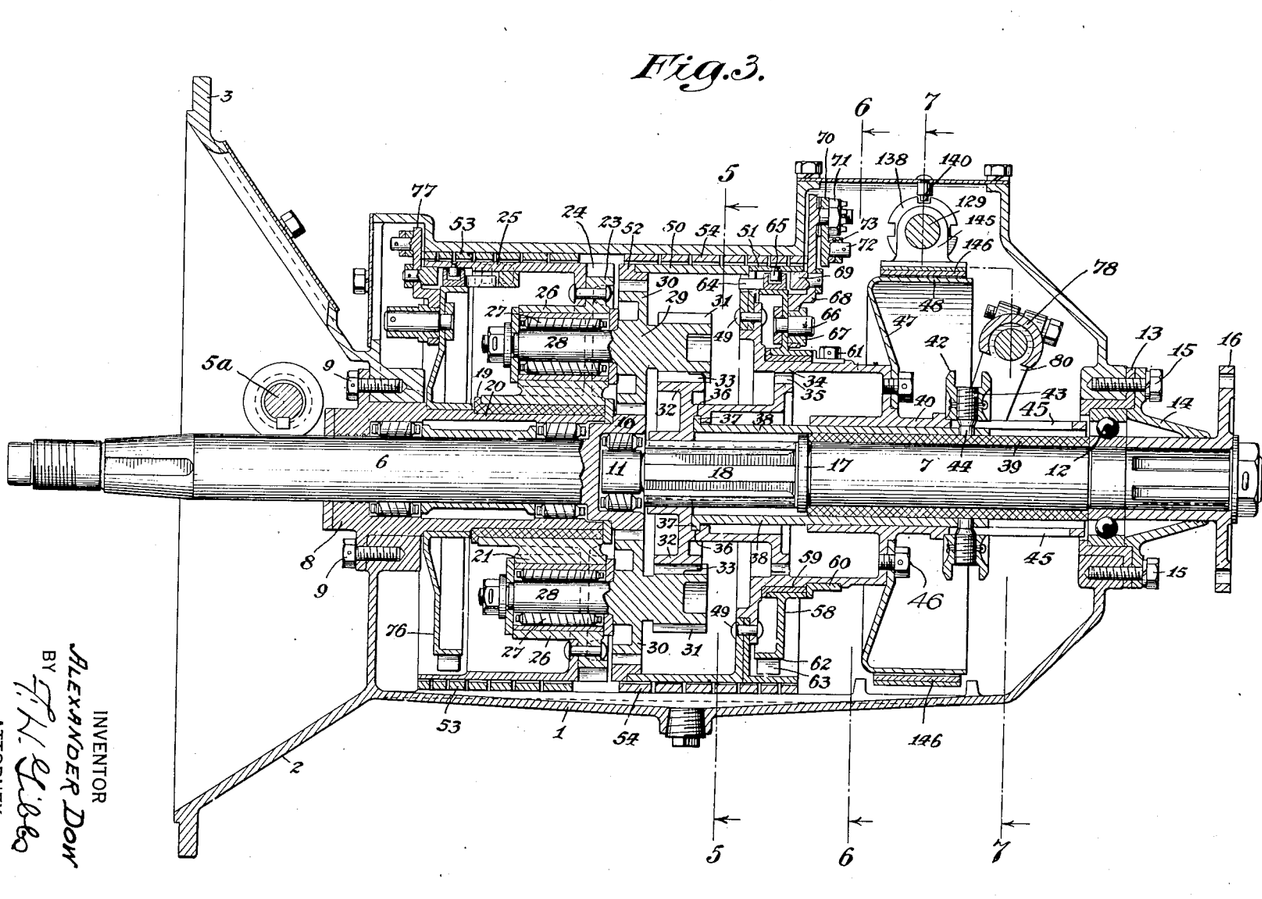
Fig. 3 is a central vertical longitudinal section of Fig. 1 on an enlarged scale.
Figure 4:
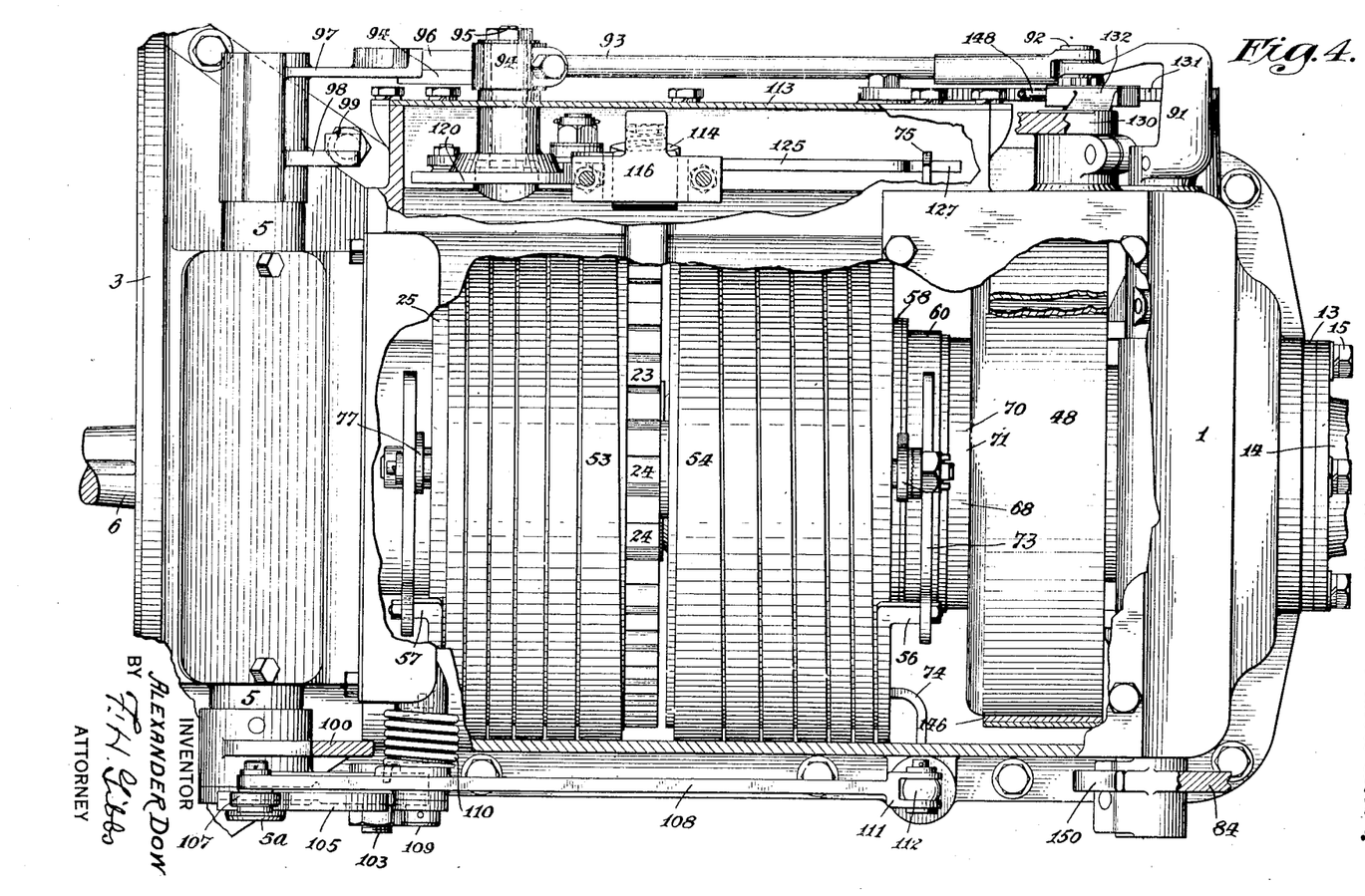
Fig. 4 is a plan view of the major portion of Fig. 1 on a larger scale than that of Fig. 3 with the case cover removed and some of the parts broken away and in section.
Figure 5:
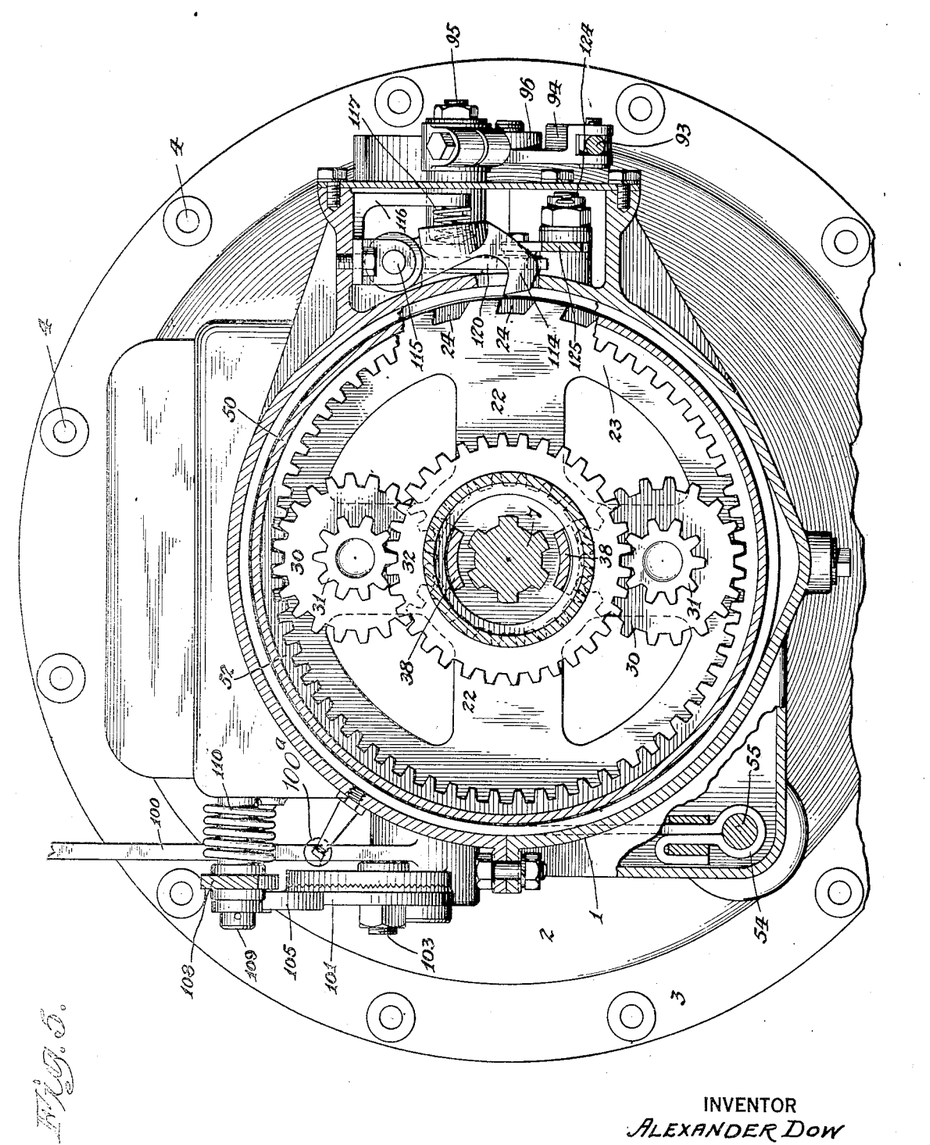
Fig. 5 is a vertical cross section taken on the line 5—5 of Fig. 3 and upon an enlarged scale.
Figure 9:
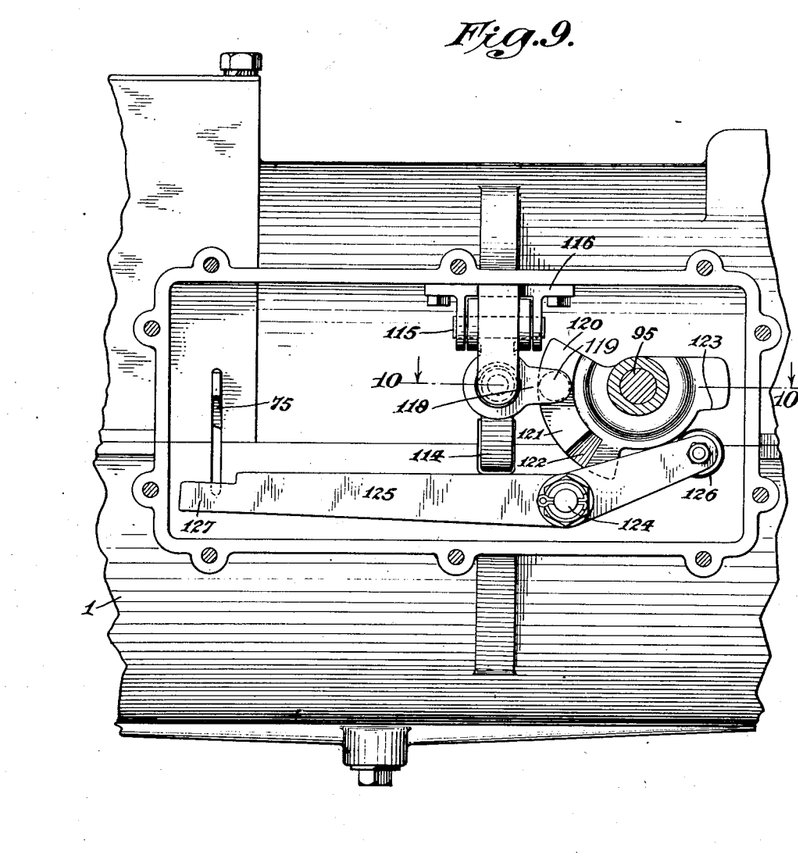
Fig. 9 is a side elevation of the reverse mechanism with the cover thereof removed.

The frame, or casing, 1 shown in Figs. 1 to 7, inclusive, and Fig. 9, is of a hollow, generally cylindrical form throughout the greater portion of its length, terminating at the end adjacent to the engine in a conical-shaped housing 2 of flaring form suitable for enclosing the engine clutch and provided with a flange 3 to fit the frame of the engine, or its bell housing, to which it is securely attached by bolts (not shown) that pass through holes 4 shown in Fig. 5 and fasten the casing to the engine frame.

For convenience in assembling, casing 1 is split throughout its length in a horizontal central plane and is furnished with flanges in order that the two halves may be securely bolted together. It is also provided with various surfaces, bosses, lugs and apertures to properly receive and support the parts attached to or cooperating with it, the purposes of which will be more fully described later. Clutch housing 2, shown in section in Fig. 3, is of a form to suit the particular make of clutch used with the engine. It is provided on each side with the bosses 5, best shown in Fig. 4, bored for bushings in which clutch shaft 5ª for operating the clutch by means of the clutch pedal, is mounted.

Casing 1 is also provided with two covers, one to afford access to the clutch and the other to the mechanism of the transmission, each of which is clearly shown in the drawings. The casing, when assembled, affords an oil tight chamber for the mechanism contained within it and is further provided with a drain plug.

Referring to Fig. 3: Passing centrally through casing 1 are the two shafts 6 and 7. Shaft 6 carries the engine clutch and is mounted to rotate on roller bearing contained in the bearing retainer 8 rigidly attached by bolts 9 to the front wall of the casing. Integral with shaft 6, upon its inner end, is cut sun gear 10 furnished with a ground orifice to receive a roller bearing to support the pilot end 11 of shaft 7. Shaft 7 is suitably supported at its other end in a ball bearing 12 held by the bearing retainer 13 which in turn is held in position by oil retainer 14 and bolts 15. Shaft 7 is also kept from longitudinal displacement by face plate 16 splined to shaft 7 which securely holds the ball bearing against a shoulder on shaft 7. This face plate 16 constitutes one portion of the conventional universal joint which drives the propeller shaft of the car. Near its inner end shaft 7 is provided with collar 17 and a splined portion 18.

Provided with a suitable bushing 19 and adapted to rotate freely upon portion 20 of bearing retainer 8 is the gear head 21. Gear head 21, as is best shown in side elevation in Fig. 5, consists of a hub with arms 22 and a rim 23, best shown in Fig. 3. This rim 23 has cut upon its periphery the serrations 24 seen in side elevation in Fig. 5, the purpose of which will be further explained. Securely attached by rivets or otherwise to rim 23 is the cylindrical drum 25, which affords a broad rim of suitable size for gear head 21. Two of the opposed arms 22 are provided with bosses 26 bored properly to receive bearings for the planet gears as best seen in Fig. 3. These bearings can be plain bushings or anti-friction bearings as shown in Fig. 3 at 27.

Mounted to rotate freely in bearings 27 and held against longitudinal movement in any suitable manner, are the stud ends 28 of compound planet gears 29. Each of the planet gears 29 is cut with a larger gear 30 and a smaller gear 31 of wider face. Gears 30 are so mounted in the gear head as to be in proper toothed engagement with sun gear 10. Further, gear 31 is of such proportions as to properly engage main driven gear 32. Gear 32 is splined to slide freely upon and to rotate with main driven shaft section 7. Means which will later be described are provided to move gear 32 longitudinally along shaft 7 at the will of the driver. As is clearly seen in Fig. 3, gear 32 is provided with a broad face a portion of which is reduced in circumference at 33 to form a suitable tooth clutch to engage the conjugate internally cut tooth clutch 34 in the second speed rotor later to be described. Gear 32 has a cup-like extension at the end of which are cut similar clutch teeth 35 shown in Fig. 3 in the position for high speed driving in engagement with teeth 34 just described. Gear 32 is also furnished with an internal annular groove 36 adapted to receive the shouldered ends 37 of the gear shifting fingers 38 which are so constructed as to afford means for moving gear 32 along shaft 7 when desired.

Figure 6:
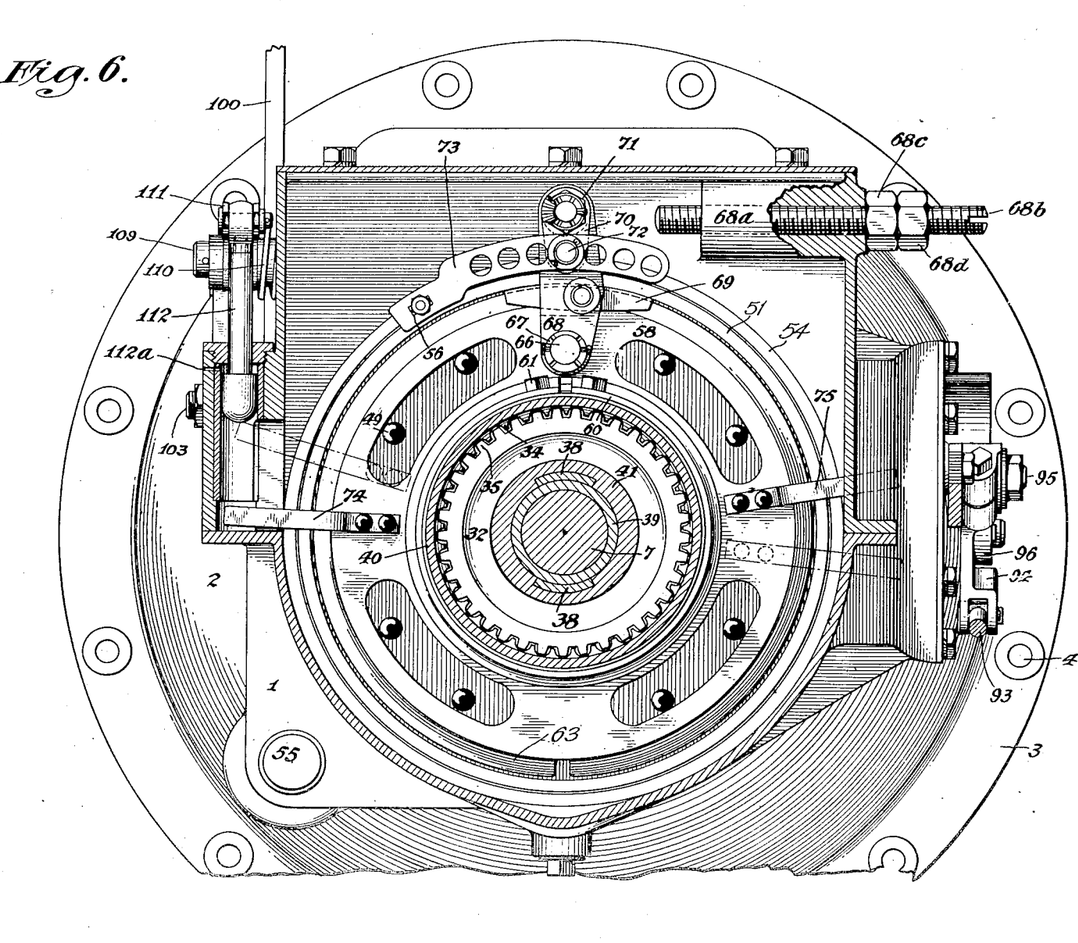
Fig. 6 is a similar view on the same scale as Fig. 5 but taken upon the lines 6—6 of Fig. 3.

Mounted to turn freely on shaft 7 and held against lateral displacement on the one end by collar 17 and on the other by bearing 12 is the bushing 39 securely carried by second speed rotor 40. Referring to Fig. 6, which is a section upon line 6—6 of Fig. 3, it will be observed that second speed rotor 40 is provided with a hub portion 41, suitably grooved to permit gear shifting fingers 38 to freely slide therein. This view also shows clearly the clutch teeth 35 of gear 32 in proper toothed engagement with the conjugate teeth 34 cut in the second speed rotor as described in connection with Fig. 3.

Mounted to slide freely upon the hub of second speed rotor 40, is the grooved gear shifting collar 42 provided with two stud screws 43, Fig. 3, the stud ends of which 44 project through slots 45 in the rotor hub and enter holes provided therefor in the ends of the gear shifting fingers 38. It is apparent from this construction that any movement of the grooved collar 42 along the rotor hub causes gear 32 to have the same longitudinal movement and thus collar 42 becomes the means for establishing the position of gear 32 along shaft 7 as may be desired.

Figure 7:
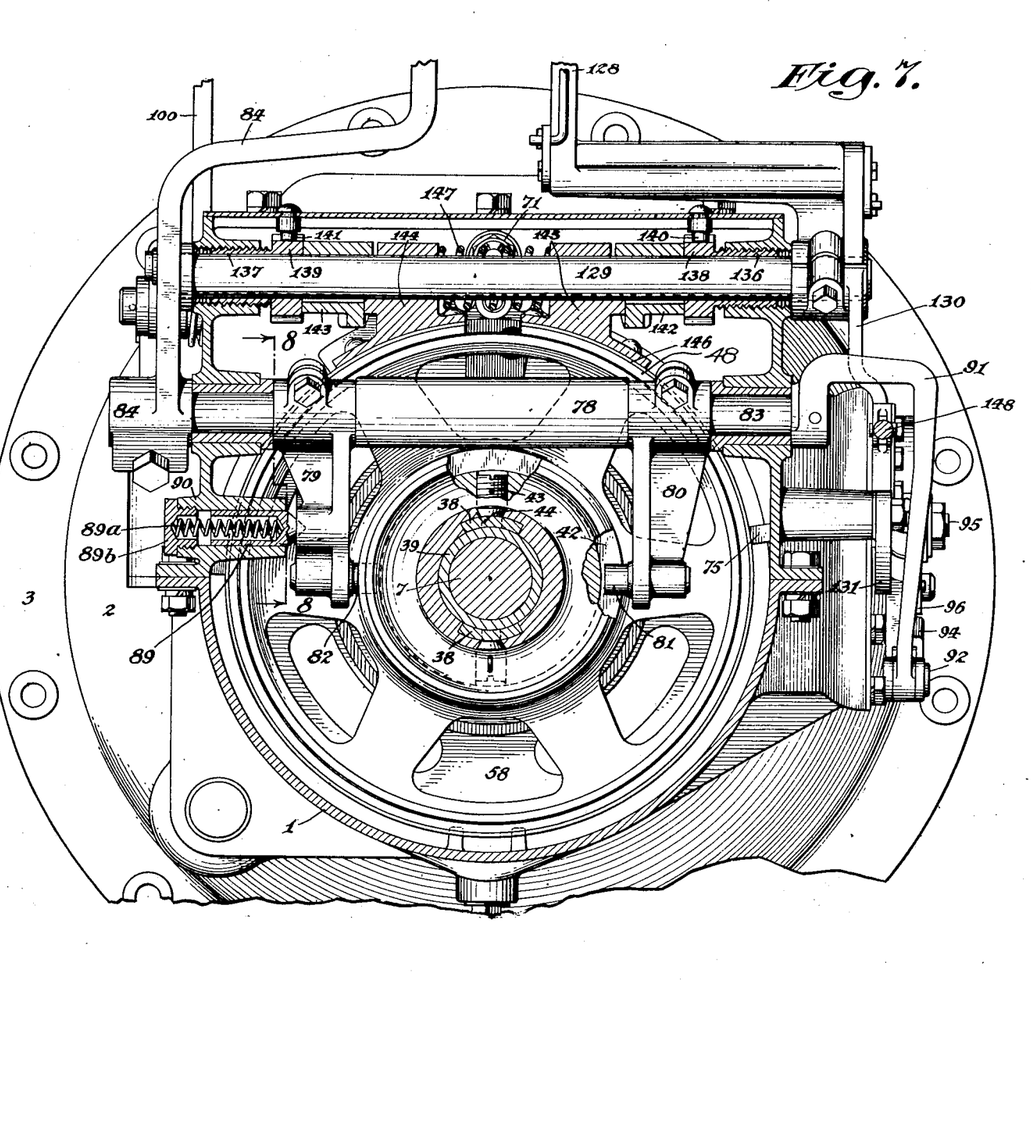
Fig. 7 is a similar view on the same scale as Fig. 6 but taken upon the line 7—7 of Fig. 3.

Rigidly secured by bolts 46, or otherwise attached to second speed rotor 40, is brake drum 47, having a broad rim 48, as is best shown in Fig. 3 and Fig. 7.

Firmly secured by rivets 49 or otherwise suitably secured to second speed rotor 40 are the two flanged rims 50 and 51, which, as the same are placed in close contact, form a wide drum-like periphery for the second speed rotor. By welding or otherwise secured to the portion 50, and located within it, is the annular gear 52, provided with teeth of such number and size as to be in proper toothed engagement with gears 30 of the compound planet gears 29 already described. This gear is shown clearly in Fig. 3 and in side elevation in Fig. 5.

It is thus seen that sun gear 10, gears 30 in mesh therewith, annular gear 52 in engagement with gears 30, gears 31 integral with gears 30 and in engagement with main driving gear 32, constitute the epicyclic train of the transmission.

It is also to be noted at this point that both gear head 21 and second speed rotor 40 are both gear carrying members free to rotate about shafts 6 and 7, respectively.

Consulting Fig. 3: This shows the gear train set in position to drive in forward high gear or with a gear ratio of 1:1 between the shafts 6 and 7. This follows from the fact that clutch teeth 34 and 35 are in engagement. Under these circumstances second speed rotor 40 is compelled to rotate as one body with gear 32 and shaft 7. Annular gear 52 therefore turns in unison with gear 32; hence there can be no rotation of the compound planets 29 which merely act as keys between sun gear 10 and annular gear 52, and the whole system rotates in unison in the same direction.

Disengage clutch teeth 35 from teeth 34 by moving gear 32 sufficiently to the right and a different condition follows.

Under these circumstances, when shaft 6 is turned clockwise and a resistance to the rotation of shaft 7 is placed upon it, gear head 21 and second speed rotor 40 will both idle backward anti-clockwise and no power will be conveyed through the transmission. Note also that the relative backward velocities of the gear head and the second speed rotor will not be the same, the second speed rotor travelling backward at the greater velocity.

If on the other hand gear head 21 is held against backward rotation, and shaft 6 is rotated, the driving gear train will be: Gear 10 driving gear 30 and gear 31 driving gear 32, gears 30 and 31 rotating upon fixed axes. This constitutes the low speed of the gearing.

If second speed rotor 40 is held against back rotation while gear head 21 is left free, then gear 10 will drive gear 30 which in turn will roll upon annular gear 52 and the drive to shaft 7 will be imparted through gears 31 and 32 with the axes of gears 30 and 31 advancing in the same direction as the rotation of shaft 6, and a higher gear ratio will be established. This constitutes the second or intermediate speed of the transmission.

The automatic mechanism for checking the backward rotation of the gear head and of the second speed rotor without shock and at the same time permitting either or both to take up instantly a forward rotation without resistance is now to be set forth.

In Fig. 3 in vertical section and in Fig. 4 in plan are seen two coil brakes, one, designated 53, surrounding the drum 25 of gear head 21 and the other, designated 54, surrounding the second speed rotor drum 48. These coil brakes are preferably helical springs formed of flat tapering metal one end of each of which is securely anchored by means of an eyelet at its end to the anchor stud 55 located in casing 1 and shown in Figs. 1 and 5. These coils extend around the drums of the gear head and of the second speed rotor such a number of convolutions as will check the reactions of engines of various torques. As seen in Fig. 4, second speed coil 54 extends around the drum of the second speed rotor in a right-handed helix of about 6 turns, terminating at the projecting lug 56, and the low speed coil 53 extends in a left-handed helix about 6 turns around the drum of the gear head, terminating in a similar lug 57. Both these coils are formed of such diameter that their elasticity causes them to hug the interior of casing 1, which is bored for the purpose, leaving a clearance between their inner circumferences and the outer circumferences of the drums, of about $\frac{1}{32}$nd of an inch, thus leaving the drums with suitable clearance to revolve freely when the coils contact with the casing. As the operation of the two coils on their respective drums are similar, an explanation of the action of the second speed coil only will only be given in detail and then the slight difference between the two pointed out.

Referring to Fig. 3: Mounted to rock freely upon second speed rotor 40 is seen the coil controlling pulley 58. This pulley is provided with a bushing 59 and is kept from lateral movement by a shoulder on the rotor on the one side and by a split ring 60 clamped by screws 61 in a groove on the other. Pulley 58 may be of sheet metal or a light casting and is provided at its circumference with a rim 62. Split ring 63 surrounds rim 62 with elastic pressure. Ring 63 is provided with a lug 64 entering an orifice in rotor 40 in such a manner that ring 63 partakes of any movement of rotor 40. Ring 63 is held from lateral displacement on rim 62 by pins 65 riveted to the rotor and formed to enter slots therefor in ring 63.

From what has just been stated, it is clear that when rotor 40 rotates in either direction ring 63 will cause a frictional tension on pulley 58 drawing it with it to the extent of its movement and then slipping over the rim 62. It is also pointed out that when rotor 40 acquires a certain speed of rotation that due to centrifugal force split ring 63 will open and will no longer contact with rim 62 but will press against the interior surface of the rotor rim and revolve entirely free from contact with pulley 58. But as soon as its speed has sufficiently decreased split ring 63 will again hug pulley 58, frictionally actuating it. Stud 66 is rigidly riveted to pulley 58. Rotatable on this stud 66 and adjustable therewith is eccentric bushing 67. Rotatably mounted on bushing 67 is coil pulling lever 68. Suitably threaded in a boss 68$^a$, Fig 6, projecting on the inside of casing 1, is the adjustable stop screw 68$^b$, with locking nuts 68$^c$ and 68$^d$ mounted in the pathway of lever 68. The purpose of this stop is to limit the amount of movement of lever 68 and pulley 58 when tightening coil 54 of the second speed rotor 40, in order to limit the amount of tightening of the coil upon the drum in order that the same may not be exposed to excessive tension.

Mounted to rock on lever 68 is the clamp block 69 in such a position that when the lever 68 is rocked to the left as seen in Fig. 6, the clamp block will tend to clamp pulley 58 to rotor 40 by contact with the inner surface of the rotor, but when moved to the right the clamping action disappears as clamp block 69 clears the rotor.

Mounted on lever 68 is the short lever 70 serrated to match similar serrations on lever 68 and held in position by nut 71. Projecting from the end of lever 70 is stud 72. Connecting rod 73 provided with a series of holes for purposes of adjustment connects stud 72 with the projecting end 56 of the second speed coil. In case coil 54 requires adjustment for any reason a different hole in connecting rod 73 can be slipped over stud 72 and a fine adjustment also made by loosening nut 71 and placing lever 70 in a different set of serrations.

The purpose of the mechanism just described is to so increase the pull of the coil end as to insure its sufficiently tightening the coil on the rotor drum to cause it to withstand the reaction of driving. Its operation increases the pull of the friction ring 63 to any extent depending upon the angularity of the clamping block with reference to a radial line through lever 68 and this can be altered by the adjustment afforded by eccentric bushing 67.

Referring to Fig. 6: Pulley 58 has riveted to it on each side projecting arms, one projecting through the side of casing 1 into the pathway of the reverse mechanism and the other into the pathway of a plunger later to be described. One of these arms is designated 74 and the other 75. It is evident from the construction just described that if the arm 74 is forced downward, or arm 75 forced upward, that pulley 58 will cause coil 54 to press outward against casing 1 and leave the drum of rotor 40 free to rotate without contact with it. It is also clear when these arms are free to move that when rotor 40 starts backward, or in an anti-clockwise direction, its friction ring will cause clamp 69 to tighten, thus closing the coil upon the drum of the rotor and holding it against backward rotation. It is also clear that when rotor 40 reverses its direction that the coil will unwind immediately assuming a position against the inside of casing thus allowing the rotor to revolve without contact with the drum.

The necessity of preventing the second speed coil 54 from tightening upon the second speed drum under certain circumstances arises from the fact that both in low gear and in reverse the second speed rotor must be free to continously revolve anti-clockwise without any contact with coil 54. When so revolving friction ring 63 is tending to tighten this coil and the purpose of arm 74 is to afford means controlled by the clutch pedal to depress arm 74 and hold it down while the car is being driven in low gear, and the purpose of arm 75 is to afford means for the reverse gear controlled by the gear shifting lever to hold coil 54 away from the drum of the second speed rotor while the car is driving in reverse. The depression of arm 74, or the raising of arm 75, totally eliminates the second speed and leaves the transmission in a condition to operate only on low or high gear. At any time, however, that these arms are allowed to be free second speed again becomes available to the driver. It is well to understand at this point that the low speed rotor never has a continuous anti-clockwise movement but is merely checked by the coil against backward movement or revolves in a clockwise direction. On the other hand, the second speed rotor revolves both forward and backward continuously, or it may stand at rest, and hence arms 74 and 75 are provided. Similar arms are not required on the low speed friction pulley 76, nor is there any need of the fine adjustment afforded the second speed coil puller through arm 71 and its conjugate serrations. Hence in the low speed coil pulling mechanism the connecting rod similar to 73 is attached at one end to the projecting lug from the coil and at the other directly to the arm 77 which functions in the same manner as arm 68 for the second speed coil. Referring again to gear 32 as shown in Fig. 3, it will be noted that the second speed rotor 40 is sufficiently recessed to permit this gear to be drawn to the right to a point where clutch teeth 33 can enter the female teeth 34. Under these conditions the car will move in the reverse direction under the drive of the engine for the driving gear train at the time is as follows: Gear 10 drives gear 30; gear 30 drives annular gear 52 in anti-clockwise direction; the fact that clutch teeth 34 are in engagement with clutch teeth 33 causes gear 32 to move anti-clockwise and with it shaft 7 due to the splines thereon. Gear hear 21 is held stationary, of course, during such operation in reverse.

Figure 1:
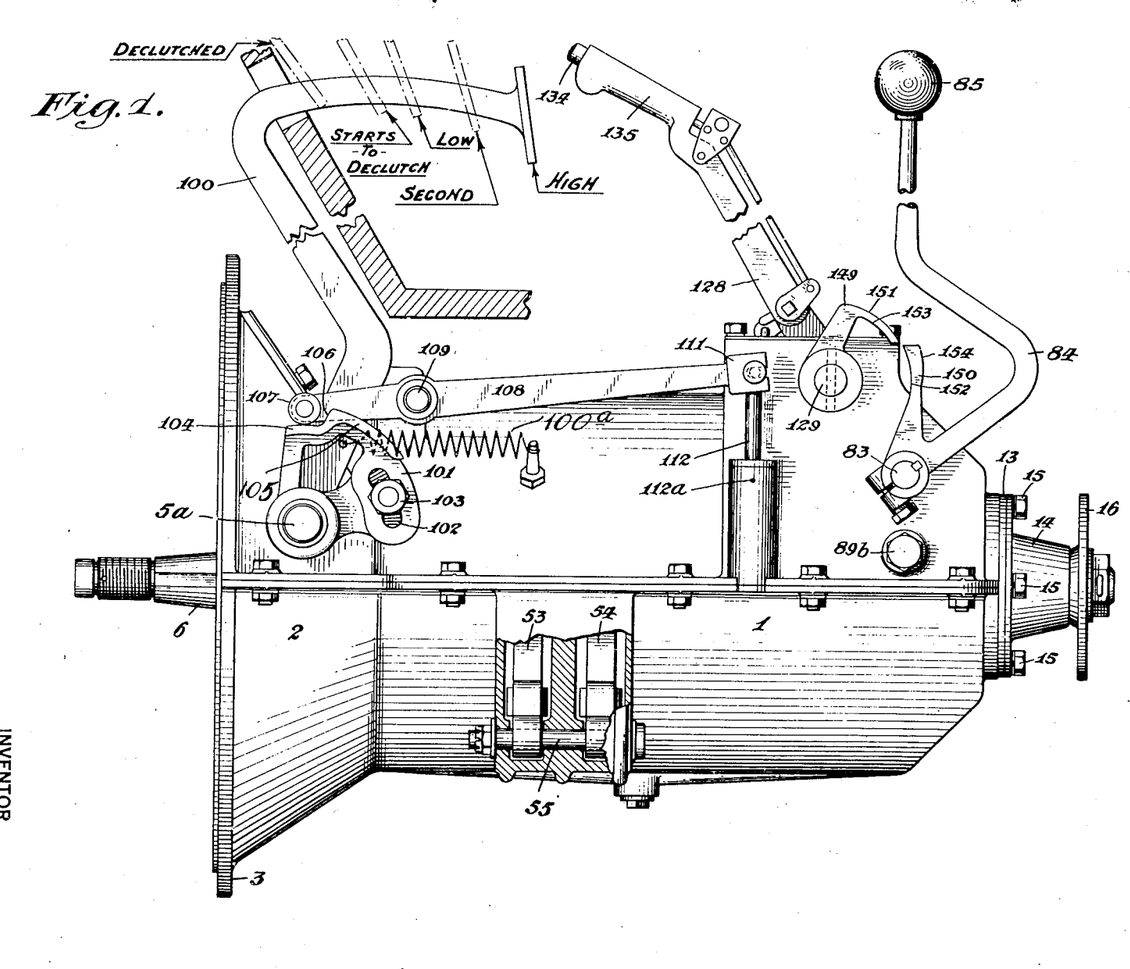
Fig. 1 is a side elevation of my improved power transmission as particularly applied to an automobile and shows a portion of the floor board of the car in section; the clutch pedal and other operating parts of the mechanism are shown in the position corresponding with that of forward high speed driving; in dotted lines are shown the various positions of the clutch pedal for low and second and also for declutching the engine; a portion of the mechanism for controlling low speed is also shown as well as the coil anchors partly in section.

It has been stated that the position of gear 32 along shaft 7 is determined by the position of grooved collar 42. Consulting Fig. 7 and Fig. 3, it will be noted that yoke lever 78 is provided. This yoke lever has two depending arms 79 and 80, at the end of which are the studs 81 and 82 entering the groove of collar 42. Lever is keyed and clamped to shaft 83 and can be rocked and set in any position by the gear shifting lever 84 which is also keyed to shaft 83. Shifting lever 84 is best seen in Fig. 1. It is provided with a ball handle 85 in a position to be accessible to the hand of the driver, and with it the operator can place gear 32 at predetermined positions along shaft 7.

Figure 8:
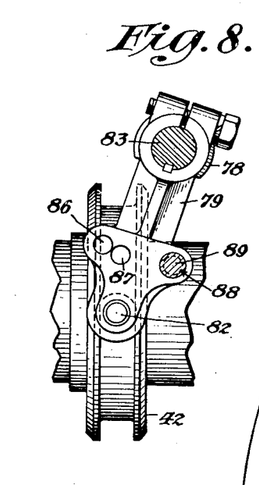
Fig. 8 is a detailed view of one end of the gear shifting yoke taken on the line 8—8 of Fig. 7.

Fig. 8 is a side elevation of arm 79 of yoke lever 78 and shows the same to be provided with three tapering orifices 86, 87, and 88. Adapted to enter any of these orifices is the tapered spring plug 89 slidable in boss 90 in casing 1 best shown in Fig. 7. Plug 89 is pressed inward by spring 89$^a$ held in position by the screw cap 89$^b$. When gear shifting lever 85 is moved to a position where plug 89 enters aperture 88 the car drives in high gear. When it enters 87 gear 32 clears gear 31 and teeth 33 also clear teeth 34 and a neutral condition of gear results. When lever 84 is further moved until plug 89 enters aperture 86 the gear is locked for reverse driving.

Figure 2:
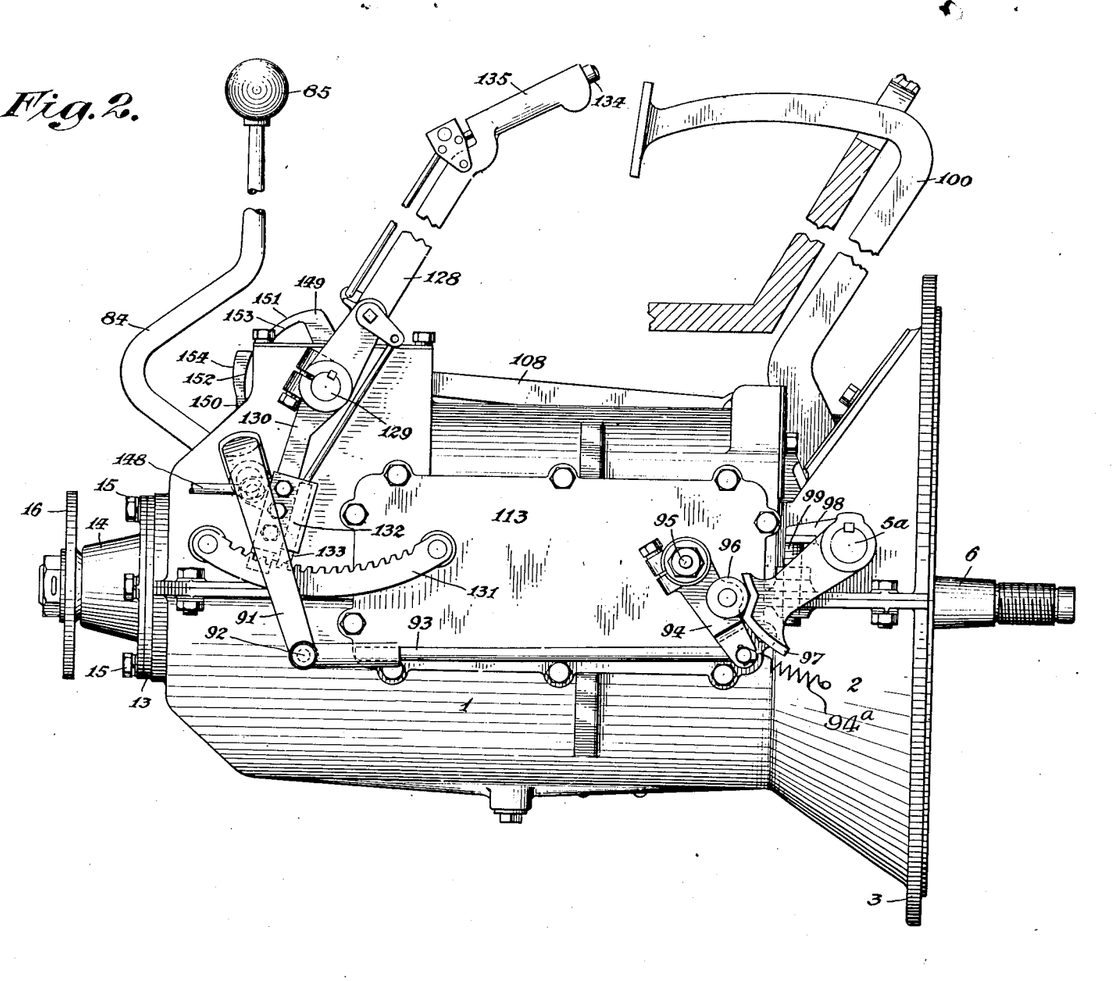
Fig. 2 is a side elevation of my transmission looking in the direction opposite to that of Fig. 1 and showing a part of the clutch mechanism and of the reverse gear and also the emergency brake and its connections.

On shaft 83 at the end opposite lever 84 is seen the depending lever 91. At its lower end through pin 92 it is connected to adjustable connecting rod 93. The other end of this rod 93 has a pin connection to the extremity of lever 94 adapted to rotate on shaft 95, Fig. 2. Lever 94 is also provided with cam roller 96 adapted to be engaged by cam lever 97 keyed to shaft 5$^a$. If desired lever 94 can be provided with a spring 94$^a$ (Fig. 4) to hold roller 96 against cam 97. By reference to Fig. 4, it will be observed that cam lever 97 has an extended hub portion from which springs lever 98 adapted to engage adjusting screw 99 seen in Fig. 2. The purpose of lever 98 and screw 99 is to afford a stop for adjusting the zero position of shaft 5$^a$ and its clutch pedal 100. Fig. 2 shows clutch pedal 100 in its zero position with lever 98 and screw 99 in contact, this being the position toward which the lever is urged by the usual spring 100$^a$. This is the position of the gear for driving in forward high gear. The position of the foot pedal under these conditions is best seen in Fig. 1 at which time lever 84 is in a position that gears 31 and 32 are engaged as shown in Fig. 3. When clutch pedal 100 is depressed to the position marked "Second" in Fig. 1 cam lever 97 will have rocked lever 94 as far as the dead time of cam 97 and this in turn through connecting rod 93 will rock lever 91 to such an extent as to disengage entirely teeth 33 of gear 32 from the clutch teeth 34 of the second speed rotor. Referring to Fig. 3, it will be noted that under these conditions gear 32 will be, as far as its teeth are concerned, still in complete engagement with gear 31, the clutch teeth 33 only having been moved from the path of gear 31.

Under these circumstances the car necessarily drives in second speed for arm 74 in Fig. 6 has not been depressed nor arm 75 lifted, and second speed rotor 40 is checked by coil 54. It will also be noted that any further rotation of shaft 5ª will not further move lever 94 as its dead time has been reached.

Referring to Fig. 1: Mounted on shaft 5ª is cam 101. The body of this cam is slotted at 102 and is provided with serrations adapted to engage similar serrations on a projecting arm from lever 100. By means of bolt 103 the position of the clutch pedal with reference to the foot board of the car can be regulated as lever 100 is free to turn upon shaft 5ª and can be fixed at any angle therewith. Cam 101 is formed with two dead time portions 104 and 105 and an intermediate actuating face 106. Cam 101 is adapted to engage roller 107 mounted on the end of lever 108, free to rotate upon stud 109 as a fulcrum. Referring to Fig. 4 it is seen that lever 108 is connected with spring 110 in such a manner as to cause roller 107 to always hug cam 101. Stud 109 is firmly located in a lug projecting from the casing 1 provided therefor. Lever 108 at its end 111 is slotted to engage a pin in stud 112 best shown in Figs. 1 and 6.

Stud 112 is arranged to slide vertically in a bushing provided for it in a lug of casing 1 and is located in such a position that its downward movement will cause it to engage arm 74 and press the same downward into the position shown in Fig. 6. As has already been explained, when lever 74 is thus held downward the car necessarily drives in low gear because second gear has been eliminated. As shown in Fig. 6, stud 112 is formed with a dash pot action, air being permitted to enter and discharge from the hole marked 112ª in Fig. 1. The purpose of this dash pot construction is to prevent the sudden gripping of the second speed coil if the driver permits the pedal to rise too quickly to the position for second speed without first throttling down the engine to its synchronizing speed.

Referring to the positions of clutch pedal shown in Fig. 1, it has been explained that when the pedal is depressed to the position marked "Second" cam 97 has concluded its operation and the car drives in second. Up to this time cam 101 has not lifted roller 107. But when the clutch pedal has been depressed to the position marked "Low" in Fig. 1, roller 107 has mounted face 106, stud 112 has been depressed and the car necessarily drives in low gear as long as this position of the pedal is maintained. It is to be understood that in all engine clutch construction where a yoke and collar is employed that a certain amount of clearance between the yoke lever and collar is provided else the same would drag. It is this clearance only which is taken up in changing the gear and it is only after point marked "Low" in Fig. 1 has been reached that declutching begins and the final declutching is only accomplished when the pedal has reached some such position as that marked "Declutched" in Fig. 1. In starting the car from a condition of rest lever 84 is first moved to the neutral position of the gear. The engine is started; clutch pedal is depressed to its maximum declutching position; gear shifting lever 84 is moved to put the transmission in gear; the throttle is opened; the pedal is permitted under its conventional spring to rise; when it reaches "Low" position the clutch is engaged and the car starts in low gear; it is accelerated in this gear by the throttle; when the driver desires to progress to second speed he closes his throttle; the momentum of the car spins the central members of the epicylic train; he now permits the pedal to rise to the position of second gear; arm 74 is no longer depressed and the car instantly assumes second gear; when he desires to progress to high gear he again for an instant closes the throttle, again synchronizing the elements of the epicyclic train, and by removing his foot from the pedal it returns to the position marked "High" when teeth 34 and 35 again engage.

In changing from high to second he has only to depress the clutch lever 100 to the proper point. This is easily done on an up-grade by momentarily closing the throttle when teeth 34 and 35 will easily slip apart. He can do it at any speed of the car for it is a matter of disengaging gears instead of engaging as is the difficulty in sliding gear transmission. Means will be further explained which are provided in connection with the emergency brake to indefinitely hold the car in second gear with the foot removed from the pedal. Any further depression of the pedal causes the car to travel in low gear as is easily understood.

Figure 10:
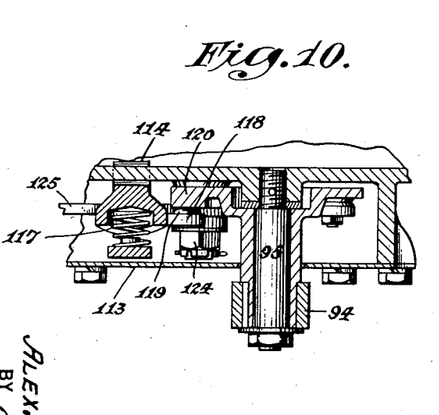
Fig. 10 is a horizontal sectional view on the line 10—10 of Fig. 9 showing the manner in which the reversing mechanism is mounted.

For the control of reverse driving, the mechanism shown in Figs. 5, 9, and 10, and contained beneath cover plate 113, Fig. 2 is provided. Three functions have to be performed to meet these reverse conditions. First, teeth 33 of gear 32 have to be engaged with teeth 34 of second speed rotor 40. Second, gear head 21 must be prevented from clockwise rotation and arm 75 must be elevated to permit rotor 40 to rotate anti-clockwise. These three conditions are satisfied when gear shifting lever 84 is moved to its extreme forward position and when conical plug 89 has entered aperture 86 in Fig. 8. In this position clutch teeth 33 have been engaged with teeth 34 of rotor 40. By this movement of lever 84 lever 94 has been rocked to its position to the left thus rotating on stud 95. Referring to Fig. 9, contained beneath cover 113 is the mechanism shown in Figs. 9 and 10. It consist of a depending spring-actuated pawl 114 rotatable about stud 115 which in turn is held in block 116 attached to casing 1. Pawl 114 is provided with spring 117 tending to force it toward the center of the casing. Pawl 114 is formed in a manner to engage tooth spaces 24 in gear head 21 shown in Fig. 5. It will engage these tooth spaces under the action of spring 117 when so permitted. Pawl 114 is provided with arm 118, Fig. 9, and the button-shaped end 119 in Fig. 10. Under the action of spring 117 button 119 is firmly pressed against cam 120 shown in Figs. 9 and 10. This cam 120 is provided with a dead time portion 121 and an actuating portion 122. It is also provided with a roller actuating face 123. Cam 120 is keyed to the lever 94 so that it rotates when lever 94 is rocked by cam lever 97. Mounted upon stud 124 is lever 125 provided with roller 126 adapted to engage face 123 of cam 120. End 127 of lever 125 is constructed to lie in the pathway and beneath arm 75 which controls second speed coil 54. The form of cam 120 is so laid out as to harmonize its various functions. When reverse is required, the car is stopped; the main clutch is disengaged; the driver moves the shift lever; first, lever 125 elevates arm 75, thus holding the coil 54 released; second, cam 120 permits pawl 114 to enter the tooth spaces 24, Fig. 5; third, teeth 33 engage teeth 34.

It will be noted that lost motion exists between face 123 of cam 120 and roller 126. This is for the purpose of not disturbing the position of the reverse mechanism when the car is put in second gear by the movement of lever 94 under the action of cam 97. Restoring lever 84 to the position shown in Figs. 1 and 2 causes pawl 114 to be withdrawn from tooth spaces 24 and places the gear again in condition for forward running.

Referring to Figs. 1 and 2, and particularly Fig. 2, 128 is the emergency brake lever. It is keyed to brake shaft 129, best seen in Fig. 7. Lever 128 has a depending arm 130 adapted to sweep and clear toothed sector 131. Arm 130 is provided with a guide block 132 to guide detent 133, Fig. 2, in its movement. Connected with the detent 133 are the necessary rods and levers by means of which the movement of detent 133 is controlled by thumb latch 134 in brake handle 135. The connections between the detent and thumb latch are so clearly shown in the drawings that no further description is necessary.

Referring to Fig. 7, it is seen that brake shaft 129 is arranged to rotate in adjustable bushings 136 and 137 threaded into casing 1 in such a manner that the distance between the two heads thereof, 138 and 139, can be adjusted to properly locate and hold the brake band in position. Each of the heads 138 and 139 is provided with a series of slots upon the circumference to permit the entrance of pins 140 and 141 riveted in the cover plate for the purpose of holding the adjustment.

Keyed to shaft 129 are the two brake cam heads 142 and 143 engaging conjugate cam heads 144 and 145 (slidable on keys), to which brake band 146 is riveted at either end. Interposed between cam heads 144 and 145 is the compression spring 147 for the purpose of holding brake band 146 free from brake drum rim 48 shown in Fig. 3.

The configuration of cam heads 142 and 143 and their conjugate cams 144 and 145 can be of any suitable form but in practice it is found desirable to shape them so that during the first half of the stroke of the emergency lever 128 the brake band 146 is firmly set on brake drum 48, after which the cam surfaces afford dead time which may be utilized to tighten brake bands upon the rear wheels of the vehicle without disturbing the setting of band 146. This is accomplished by suitably connecting up brake rod 148 shown in Fig. 2 with the rear wheel brake connections.

Consulting Fig. 1, it is seen that brake shaft 129 has pinned to it on the end opposite that to which brake lever 128 is attached the hook-shaped lever 149 and also that gear shifting lever 84 has integral with it lever 150. The purpose of these levers and their mutual operation will now be explained.

In Fig. 1, gear shifting lever 84 is shown in position to drive the car in high forward speed. Under these circumstances emergency brake lever 128 can be moved and the face 151 of lever 149 will clear face 152 of lever 150. Thus at any time with the gear set in high, the application of the brake on drum 48 performs the same function as the conventional transmission brake ordinarily used on cars. It will also be seen that when gear shifting lever 84 has been moved to the left in Fig. 1 to the position necessary for second speed, that surface 153 of lever 149 will clear surface 154 of lever 150, so that brake lever 128 can also be moved when lever 84 is in position for second speed. When the brake is set by lever 128 with 84 in the position just referred to, the brake serves to hold second speed rotor 40 at rest thus locking the gear in second speed so that the engine can be utilized as a brake in descending hills or in long periods of running on second gear, while at the same time the foot can be removed from the foot pedal without danger of the gear being placed in second and in high at the same time, which might be the case if lever 84 were returned to its high position while the emergency brake is locked in second. This results from the fact that hook 149 will have surrounded lever 150 in such a manner that lever 84 cannot be returned to its high position until emergency lever 128 has been returned to its zero position.

In the diagrammatic views, Figs. 11, 12, 13 and 14, the conditions of movement and rest of the various members of the epicyclic train during the operation of the different speeds is set forth. Arrows indicate clearly the direction of movement of the various parts and the absence of an arrow indicates that this particular part is at rest. Teeth in engagement are shown properly in line but teeth out of engagement are staggered as at Fig. 14. These views are taken from the rear of the car looking towards the engine, hence the sun or driving gear 10 appears to have left-handed rotation whereas it would appear to rotate right-handed if viewed from the engine toward the rear.

Figure 11:
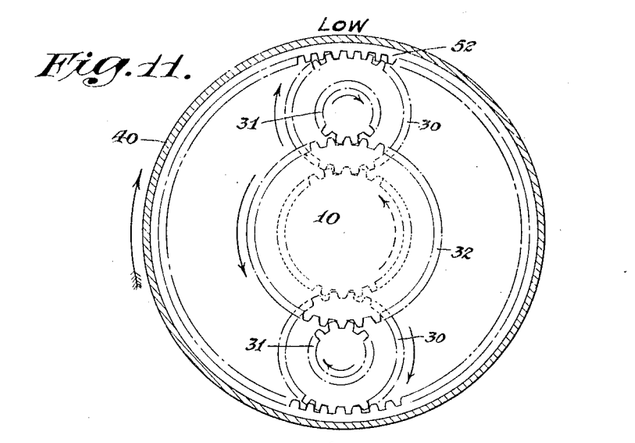
Figs. 11, 12, 13 and 14 are diagrammatic views of the gear train and correlated parts and illustrate the relative directional relations thereof in low, second, high and reverse, respectively.

Fig. 11 shows the condition in low gear, with annular gear 52 idling clockwise and with gear head 21 and the axes of the planets 30 and 31 at rest.

Figure 12:
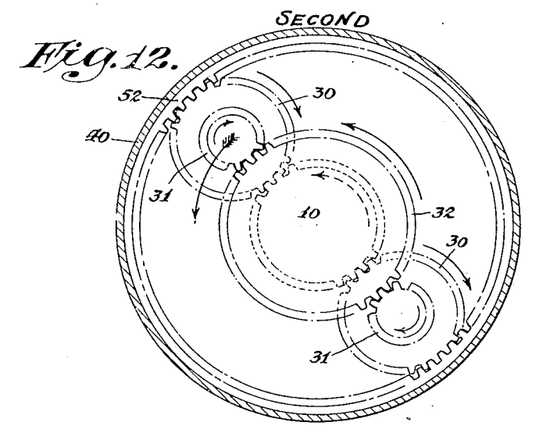

Fig. 12 exhibits the condition when driving in second speed, with second speed rotor at rest and gear head 21 and the axes of the planets 30 and 31 rotating in the same direction as sun gear 10.

Figure 13:
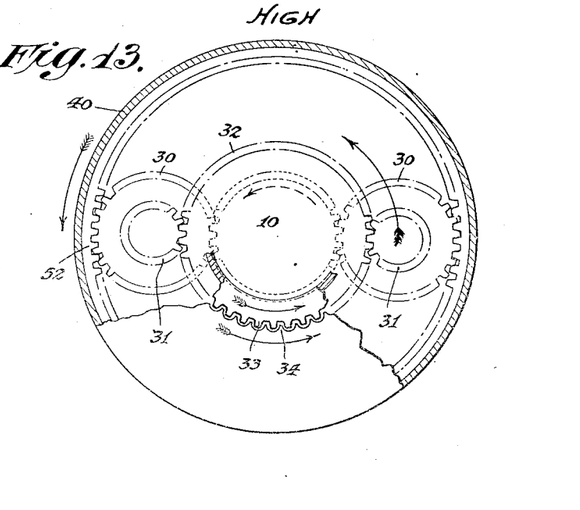

Fig. 13 exhibits the condition during high speed driving when all parts of the train, including the gear carrying members, are rotating in unison in the same direction, with none of the gears running on one another.

Figure 14:
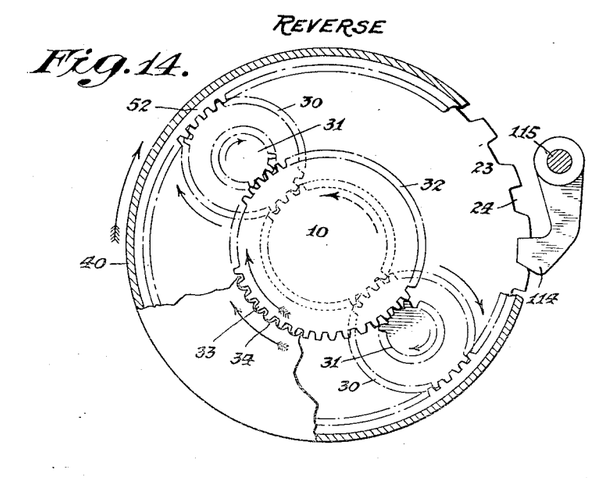

Fig. 14 shows the condition when driving in reverse. It is seen from the staggered drawing of the teeth that gear 32 has been withdrawn from engagement with the teeth of the pinions 31 and that the drive is from the sun gear 10 through gear 30 to annular gear 52 and through clutch teeth 34 to teeth 33, all of which has been described.

Many alterations in structure and widely differing embodiments and applications of my invention will suggest themselves to those skilled in the art of constructing mechanisms of this character, without departing from the spirit and scope of my invention. Therefore, I do not desire to be limited to any of the details enumerated in the particular construction set forth herein.

Having now described my invention, what I claim as new and desire to secure by Letters Patent is:

1. In a transmission of the character described, the combination with driving and driven shafts, engine clutch, and foot pedal mechanism for operating the clutch, of epicyclic change speed gearing for interconnecting said shafts including rotatable parts for controlling and varying the transmission ratio and a gear on the driven shaft provided with means for clutching one of said rotatable parts, brake means for the rotatable parts in question, and means controlled by said foot pedal mechanism for selectively applying and releasing the brake means and for engaging the clutch means of said gear with the rotatable part aforesaid.

2. In a transmission of the character described, the combination with driving and driven shafts, engine clutch, and foot pedal mechanism for operating the clutch, of epicyclic change speed gearing for interconnecting said shafts including rotatable parts for controlling and varying the transmission ratio and a gear on the driven shaft provided with means for clutching one of said rotatable parts, normally engaged with said part, coil brakes for said rotatable parts, means operated on initial depression of the foot pedal to disengage the aforesaid normally engaged clutch teeth, and means operated by further depression of the foot pedal for insuring release of one of the coil brakes.

3. In a transmission of the character described, the combination with driving and driven shafts, of epicyclic change speed gearing for interconnecting said shafts including rotatable parts for controlling and varying the transmission ratio, a planet gear carried by one of said parts, and a gear turning with the driven shaft for meshing with said planet gear provided with means for clutching one of said rotatable parts; brakes for said rotatable parts; a gear shifting lever; and means operated by said lever for demeshing said gear on the driven shaft from the planet gear and engaging its clutch means with the rotatable part aforesaid, for locking one of said rotatable parts against rotation, and for holding the brake of the other rotatable part released.

4. In a transmission of the character described, the combination with driving and driven shafts, of change speed gearing for interconnecting said shafts including rotatable parts for controlling and varying the transmission ratio and a gear turning with the driven shaft provided with means for clutching one of said rotatable parts; a brake for one of said rotatable parts; and means for actuating said brake to retard said rotatable part when said gear is clutched thereto as aforesaid, and to hold said rotatable part at rest when said gear is unclutched from said rotatable part.

5. In a self propelled vehicle having an emergency brake, the combination therewith of a power transmission comprising driving and driven shafts; change speed gearing for interconnecting said shafts, including rotatable parts for controlling and varying the transmission ratio and a gear turning with the driven shaft provided with means for clutching one of said rotatable parts; a brake for one of said rotatable parts; an emergency brake lever; and means operable by the emergency brake lever, when said gear is clutched to said rotatable part as aforesaid, for applying said brake prior to the application of the emergency brake.

6. In a transmission of the character described, the combination with driving and driven shafts, of change speed gearing for interconnecting them including rotatable parts for controlling and varying the transmission ratio, a brake for one of said rotatable parts and an operating lever therefor, means for altering the effective connection between the shafts and a controlling lever therefor, and means controlled by said brake lever for limiting the movement of said controlling lever.

7. In a transmission of the character described, the combination with driving and driven shafts, of variable change speed gearing for interconnecting them including rotatable parts for controlling and varying the transmission ratio and a gear splined on the driven shaft provided with means for clutching one of said rotatable parts; a shifting lever for said gear; a brake for one of said rotatable parts and a brake lever therefor; and correlative interlocking means carried by said levers for preventing movement of the gear shifting lever to clutch the gear to said rotatable part as aforesaid when the brake lever is in operative position.

8. In a transmission of the character described, the combination with driving and driven shafts, engine clutch, and foot pedal mechanism for operating the clutch; of change speed gearing for interconnecting said shafts including rotatable parts for controlling and varying the transmission ratio and a gear on the driven shaft provided with means for clutching one of said rotatable parts; a brake for one of said rotatable parts; and means operated by the aforesaid foot pedal mechanism for unclutching said gear from said rotatable part and for holding said brake released.

9. In a transmission of the character described, the combination with driving and driven shafts, of change speed gearing for interconnecting them including a rotatable part for controlling and varying the transmission ratio; a coil brake for said rotatable part; a freely rotatable pulley for actuating said brake, with means carried by said pulley for engaging one end of the brake coil and for clamping the pulley to the rotatable part; and friction means actuated by said rotatable part on reversal of driving relations in the gearing for actuating said brake pulley to set the brake.

10. In a transmission of the character described, the combination with driving and driven shafts, of change speed gearing for interconnecting them including a rotatable part for controlling and varying the transmission ratio; a coil brake for said rotatable part; a freely rotatable pulley for actuating said brake and friction means for engaging and actuating said pulley carried by said rotatable part; a lever mounted on said pulley; a friction clamp carried by said lever for engaging said rotatable part and thereby actuating the pulley; an adjustable connection between said lever and one end of the brake coil; and stop means for limiting the brake setting movement of said lever.

11. In a semi-automatic change speed device, a drive shaft, a driven shaft, a variable step by step transmission gear mechanism interposed between and connected to said shafts and having elements operable by one of said shafts to change the gear ratio between the shafts upon a reduction in speed of the drive shaft below the speed of the driven shaft, and means operable by an attendant from the exterior of the change speed device and connected to the transmission gear mechanism for controlling the operation of the said elements by said shaft.

12. In a semi-automatic change speed device, a drive shaft, a driven shaft, a variable step by step transmission gear mechanism interposed between and connected to said shafts and having elements operable by the driven shaft to change the gear ratio between the shafts subsequent to a reduction in speed of the drive shaft below the speed of the driven shaft and upon acceleration of the drive shaft, and means operable by an attendant from the exterior of the change speed device and connected to the transmission gear mechanism for controlling the operation of said elements by the driven shaft.

13. In a semi-automatic change speed device, a drive shaft, a driven shaft, a variable step by step transmission gear mechanism interposed between and connected to said shafts and having elements operable by the drive shaft to change the gear ratio between the shafts subsequent to a reduction in speed of the drive shaft below the speed of the driven shaft and upon acceleration of the drive shaft, and means operable by an attendant from the exterior of the change speed device and connected to the transmission gear mechanism for controlling the operation of said elements by the drive shaft.

14. In a semi-automatic change speed device, a drive shaft, a driven shaft, a variable step by step transmission gear mechanism interposed between and connected to said shafts and having elements operable by one of said shafts to accelerate and change the gear ratio between the shafts upon a reduction in speed of the drive shaft below the speed of the driven shaft, and means operable by an attendant from the exterior of the change speed device and connected to the transmission gear mechanism for controlling the operation of said elements by the said shaft.

15. In a semi-automatic change speed device, a drive shaft, a driven shaft, a variable step by step transmission gear mechanism interposed between and connected to said shafts and having elements operable by the drive shaft to change the gear ratio between the shafts when the drive shaft is accelerated subsequent to a temporary reduction in the speed thereof below the speed of the driven shaft, and means operable by an attendant from the exterior of the change speed device and connected to the transmission gear mechanism for controlling the operation of said elements by the drive shaft.

16. In a semi-automatic change speed device, a drive shaft, a driven shaft, a variable step by step transmission gear mechanism interposed between and connected to said shafts and having elements operable by the drive shaft to turn in one direction and transmit motion to the drive shaft at a selected gear ratio, said elements being further operable by the driven shaft to change the previously selected gear ratio between the shafts to a different ratio when the speed of the drive shaft is temporarily reduced below the speed of the driven shaft, and means operable by an attendant from the exterior of the change speed device and connected to the transmission gear mechanism for controlling the operation of said elements by the drive shaft and the driven shaft.

17. In a semi-automatic change speed device, a drive shaft, a driven shaft, a variable step by step transmission gear mechanism interposed between and connected to said shafts and having elements operable by the drive shaft to turn in one direction and transmit motion to the driven shaft at a selected gear ratio, said elements being further operable by the drive shaft to change the previously selected gear ratio between the shafts to a different gear ratio when the drive shaft is accelerated subsequent to a temporary reduction in speed thereof below the speed of the driven shaft, and means operable by an attendant from the exterior of the change speed device and connected to the transmission gear mechanism for controlling the operation of said elements by the said drive shaft.

18. In a semi-automatic change speed device, a drive shaft, a driven shaft, a variable step by step transmission gear mechanism interposed between and connected to said shafts and having elements operable by the drive shaft to turn in one direction and transmit motion to the driven shaft at a selected gear ratio, said elements being further operable by the drive shaft to change the previously selected gear ratio between the shafts to a different gear ratio when the drive shaft is accelerated subsequent to a temporary reduction in speed thereof below the speed of the driven shaft and while both of said shafts are connected, and means operable by an attendant from the exterior of the change speed device and connected to the transmission gear mechanism for controlling the operation of said elements by the drive shaft.

19. In a semi-automatic change speed device, a drive shaft, a driven shaft, a variable step by step transmission gear mechanism interposed between and connected to said shafts and having elements operable by the drive shaft to turn in one direction and transmit motion to the driven shaft at a selected gear ratio, said elements being further operable by the driven shaft to turn in an opposite direction and change the previously selected gear ratio between the shafts to a different gear ratio when the speed of the drive shaft is temporarily reduced below the speed of the driven shaft, and means operable by an attendant from the exterior of the change speed device and connected to the transmission gear mechanism for controlling the operation of said elements by the driven shaft.

20. In a semi-automatic change speed device, a drive shaft, a driven shaft, a variable step by step transmission gear mechanism interposed between and connected to said shafts and including elements operable by the drive shaft to turn in one direction and transmit motion to the driven shaft at a selected gear ratio, said elements being further operable by the driven shaft to turn in an opposite direction and change the previously selected gear ratio between the shafts to a different gear ratio when the speed of the drive shaft is temporarily reduced below the speed of the driven shaft and while both of said shafts are connected, and means operable from the exterior of the change speed device and connected to the transmission gear mechanism for controlling the operation of said elements by the drive shaft and the driven shaft.

21. In a transmission of the character described, the combination with driving and driven shafts, of a compound epicyclic change speed gearing for interconnecting them, including rotatable parts for controlling and varying the transmission ratio, a planet gear carried by one of said parts, and a gear splined on said driven shaft for meshing with said planet gear provided with alternative clutch means for connecting it to one of said rotatable parts, and means for shifting said driven gear along the driven shaft thereby disengaging its said alternative clutch means from one of the rotatable parts while still engaging said planet gear, and to a neutral position where said driven gear engages neither the planet gear nor the rotatable member.

22. In an automobile transmission, the combination with driving and driven shafts, engine clutch, a foot pedal mechanism for operating the clutch, of variable change speed gearing for interconnecting said shafts, with means for altering the geared relation between said driving and driven shafts controlled by the position of said foot pedal while the said engine clutch is in engagement.

In witness whereof I have hereunto set my hand.

ALEXANDER DOW.